(12) United States Patent
Stuart (10) Patent No.: US 10,705,997 B2
(45) Date of Patent: Jul. 7, 2020

(54) MIXDTAPE—CASSETTE TAPE REPLICA RECORD/PLAYBACK DEVICE

(71) Applicant: Steven F. Stuart, Santa Monica, CA (US)

(72) Inventor: Steven F. Stuart, Santa Monica, CA (US)

(73) Assignee: MIXD MEDIA LLC., Santa Monica, CA (US)

( * ) Notice: Subject to any disclaimer, the term of this patent is extended or adjusted under 35 U.S.C. 154(b) by 0 days.

(21) Appl. No.: 16/414,632

(22) Filed: May 16, 2019

(65) Prior Publication Data
US 2019/0354499 A1 Nov. 21, 2019

Related U.S. Application Data

(60) Provisional application No. 62/672,493, filed on May 16, 2018.

(51) Int. Cl.
| | |
|---|---|
| *G06F 13/38* | (2006.01) |
| *H01M 10/42* | (2006.01) |
| *H04W 4/80* | (2018.01) |
| *H04W 84/10* | (2009.01) |

(52) U.S. Cl.
CPC ........ *G06F 13/385* (2013.01); *H01M 10/425* (2013.01); *H04W 4/80* (2018.02); *H04W 84/10* (2013.01); *G06F 2213/0042* (2013.01); *G06F 2213/3806* (2013.01); *G06F 2213/3814* (2013.01); *H01M 2010/4271* (2013.01)

(58) Field of Classification Search
CPC .................................................. G06F 13/385
See application file for complete search history.

(56) References Cited

U.S. PATENT DOCUMENTS

| | | | |
|---|---|---|---|
| 9,535,985 B2 * | 1/2017 | Burns | ............ G06F 16/60 |
| 2006/0002198 A1 * | 1/2006 | Funahashi | ............ G06F 21/10 |
| | | | 365/189.11 |

OTHER PUBLICATIONS

Paul Burns, "MIXXTAPE—The Cassette Reinvented", Sep. 25, 2017, https://web.archive.org/web/20170925193517/https://www.kickstarter.com/projects/mixxtape/mixxtape-the-cassette-reinvented/description (Year: 2017).*

* cited by examiner

*Primary Examiner* — Farley Abad (57) ABSTRACT

A replica cassette tape mobile record/playback device includes a non-volatile memory device positioned, one or more processors, a rechargeable battery, and a personal area network transceiver chipset all positioned within the interior of the replica cassette tape device. The replica cassette device also includes one or more indicator lights, positioned at an edge of the replica cassette tape device, to identify a status of the replica cassette tape device. The replica cassette tape devise also includes computer-readable instructions stored in the non-volatile memory device, the computer-readable instructions executable by the one or more processors to: pair the replica cassette tape device with an external sound reproduction device utilizing the personal area network transceiver chipset; and communicate one or more audio files stored in the non-volatile memory device to the external sound reproduction device utilizing the personal area network transceiver chipset.

17 Claims, 5 Drawing Sheets

MIXDTAPE—CASSETTE TAPE REPLICA RECORD/PLAYBACK DEVICE

RELATED APPLICATIONS

This application claims priority to U.S. provisional patent application Ser. No. 62/672,493, filed May 16, 2018, entitled "MIX'D Tape—Cassette Tape Replica Record/Playback Device," the disclosure of which is hereby incorporated by reference.

BACKGROUND

Music has been recorded onto and played from a variety of mediums over the years including reel-to-reel tapes, 8-tracks, cassette tapes, vinyl records, CDs, DVDs, and USB/flash drives. Some of these older mediums elicit nostalgic feelings and memories of a time in the past. Like vinyl records, mixed tapes or cassette tapes are a culturally significant, even iconic part of our society and thus to many, cassette tapes are a part of our musical self-expression, our zeitgeist. Yet, unlike vinyl records, there is no current, functional expression of the cassette tape medium.

DETAILED DESCRIPTION

The foregoing, and other features and advantages of the invention, will be apparent from the following, more particular description of the preferred embodiments of the invention, the accompanying drawings, and the claims.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

References throughout this specification to one implementation, an implementation, one embodiment, embodiments, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics.

Likewise, the term "based on," "based, at least in part on," and/or similar terms (e.g., based at least in part on) are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

In some embodiments, the cassette tape mobile record/playback device may be referred to as a mixtape, a mixed tape, a MIXDTAPE, a replica cassette tape device, and/or a replica cassette device. These terms may be utilized interchangeably throughout the specification. The device may also be referred to as a replica cassette tape because it is not a true cassette tape and instead takes the form as a cassette tape. The device may also be referred to as a cassette tape mobile record/playback device because it is mobile or portable in that it may be taken from one location to another.

In some embodiments, the hubs may be free spinning such as in a real cassette tape, but the hubs do not have a functional purpose.

Figure 1A:
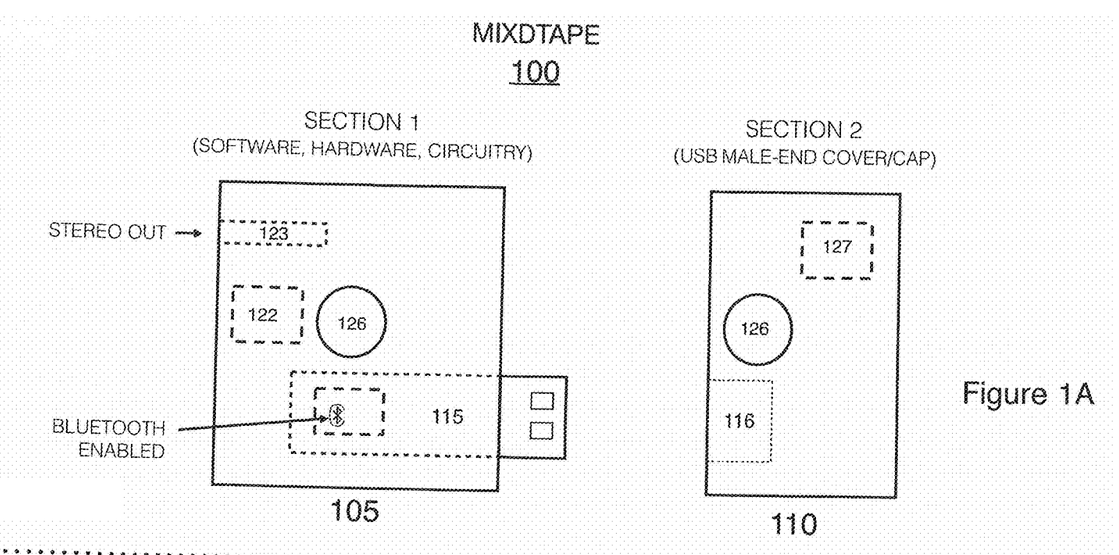
FIG. 1A illustrates a block diagram of a separated cassette tape mobile record/playback device according to embodiments.
Figure 1B:
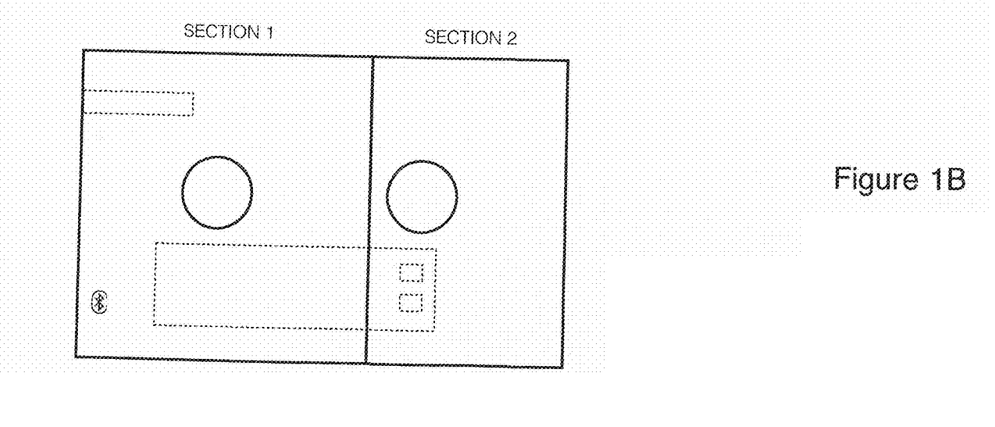
FIG. 1B illustrates a block diagram of a connected replica cassette tape record/playback device according to embodiments.

FIGS. 1A and 1B illustrate a replica cassette tape mobile record/playback device according to some embodiments. In some embodiments, a cassette tape record/playback device 100 may be made of a rubber material. In some embodiments, a replica cassette tape record/playback device 100 may be made of a plastic or a composite material. In some embodiments, a cassette tape record/playback device 100 may include a first portion or section 105 and a second portion or section 110. Although components or subassemblies may be illustrated as being located on one section of the cassette tape record/playback device, the component or subassembly may be located just as easily on the other or another section of the cassette tape mobile record/playback device. In addition, although FIGS. 1A and 1B are illustrated with two different sections, a replica cassette tape mobile playback device may be one piece, or alternatively, more than one piece. In some embodiments, a first portion or section 105 and/or a second portion or section 110 of the cassette tape record/playback device may be comprised of two pieces (e.g., a top piece and a bottom piece) that are connected or attached during manufacturing and/or assembly of the replica cassette tape record/playback device. In some embodiments, this allows components such as one or more USB storage devices, one or more wireless transceivers, other integrated circuits and/or one or more audio inputs to be inserted in between the two pieces of the cassette tape mobile record/playback device and/or on a surface of the cassette tape record/playback device.

In some embodiments, a replica cassette tape mobile record/playback device 100 may also comprise a storage device 115 (e.g., which may be a USB storage device). In some embodiments, a storage device 115 may have a storage capacity of 1 MB, 2 MB, 4 MB, 8 MB, 16 MB or 32 MB storage. As mentioned below, a storage device 115 may have a storage capacity limited to that of a storage capacity (in terms of minutes of songs or audio files) of a tape cassette or to a smaller number to approximate a use of a cassette tape. In some embodiments, this may be 60 minutes, 90 minutes and/or 120 minutes. In some embodiments, for example, a previous cassette tape may have had a capacity of storing 14 songs (e.g., 7 on each side) or may have had a capacity of 30 minutes, 45 minutes or 60 minutes per side. In some embodiments, a storage capacity of the replica cassette tape record/playback device may be limited to storing 14 songs in order to maintain the experience of using a cassette tape. In some embodiments, a storage capacity of the replica cassette tape record/playback device may be limited to a time threshold (e.g., 60 minutes, 90 minutes and/or 120 minutes). In some embodiments, software stored (e.g., computer-readable instructions executable by one or more processors of the replica cassette tape record/playback device) on the storage device 115 may be executed to count a number of songs that are being stored on the storage device 115 and when the number of songs reaches a predetermined number, the software may stop recording songs on the storage device 115. In some embodiments, software stored on the storage device 115 may be executed to count a number of minutes of audio files (or songs) that have recorded on the storage device 115. In some embodiments, once a predetermined number of minutes (e.g., 90 minutes or 120 minutes) has been reached, the software may stop recording songs (or audio files). In some embodiments, a USB device 115 may comprise electronic circuitry and/or a switch or selector to prevent the USB storage device 115 from transferring music files out from the USB device 115 or exporting music files from the USB device 115. In some embodiments, a USB device 115 may comprise one or more memory devices, one or more processors or controllers, and/or computer-readable instructions executable by a processor or controller, which may prevent the USB storage device 115 for transferring music files out or exporting music files out to another computing device. In some embodiments, this feature mimics the cassette tape which is a recording device and a playback device and not a music transfer apparatus. In addition, this provides a control for the music creator to keep clients or customers from transferring music files for permanent storage on other individual's computing device and not respecting the music creator's copyright. In some embodiments, although the storage device 115 may be referred to as a USB storage device, this may be the protocol under which the storage device operates.

In some embodiments, a storage device 115 may have a connector 117. In some embodiments, a connector may have a USB connector. In some embodiments, a connector 117 may be visible when a first section or portion 105 of the cassette tape mobile record/playback device 100 is pulled apart from the second section or portion 110. When the first section or portion 105 of the cassette tape record/playback device 100 is connected with the second section or portion 110, the connector 117 may be inserted into a recess 116 of the second section or portion 110. In some embodiments, a second section or portion 110 may comprise a cover or cap 116 embedded into an interior portion of the second section or portion and the connector 117 may be connected or coupled to the cover or cap 116.

In some embodiments, a replica cassette tape mobile record/playback device 100 may further comprise a personal area network (PAN) transceiver 120. In some embodiments, a PAN transceiver 120 may be a Bluetooth transceiver and may operate according to a Bluetooth protocol. In some embodiments, a PAN transceiver 120 may be integrated into the storage device 115 (e.g., the PAN transceiver may be integrated into the housing of the USB storage 115). In some embodiments, although not shown in FIG. 1A, a PAN transceiver 120 may be integrated into the cassette tape record/playback device 100 (e.g., it may be integrated into an opening or a recess of the rubber material of the cassette tape record/playback device 100). In embodiments, a PAN transceiver 120 may be installed and/or positioned on an exterior surface of the cassette tape record/playback device 100.

In some embodiments, because the replica cassette tape mobile playback device 100 has PAN transceiver capabilities, any electronic device and/or computing device may communicate with the cassette tape record/playback device 100 and retrieve, transfer and/or stream music files and/or digital files stored on the cassette tape record/playback device 100 to the electronic device and/or computing device. In some embodiments, for example, a mobile computing device or smartphone may pair with the replica cassette tape mobile playback device 100.

In some embodiments, such as described above, music files will be prevented from being exported or transferred from the cassette tape mobile record/playback device 100. In some embodiments, music files may be limited in their ability to have the files exported or transferred from the cassette tape record/playback device 100. In some embodiments, a mobile computing device or smartphone will not see the cassette tape record playback device 100 as an additional drive and may not retrieve the music files or digital files via a program like Microsoft File Explorer. In addition, as another example, it will not be possible for a mobile computing device or smartphone to import the music files or digital files from the cassette tape record/playback device into a music player software application already installed on the phone.

In some embodiments, it is permissible to playback the music files on the replica cassette tape mobile record/playback device 100 on another strictly playback or sound reproduction device (e.g., a car stereo and/or a speaker). In some embodiments, for example, a mobile computing device or smartphone may have a MIXDTAPE software application or other music playing software application and may playback the music files or digital files stored on cassette tape record/playback device 100 via a speaker (or sound reproduction device) that may be paired with the mobile computing device and/or the cassette tape record/playback device 100. In some embodiments, if one or more exterior speakers is Bluetooth-enabled, the mobile computing device or smartphone may playback the music files or digital files on the paired Bluetooth-enabled speakers. In some embodiments, an automobile audio system that is Bluetooth enabled may also pair with the replica cassette tape mobile playback device 100, receive streamed music files via a PAN transceiver and play the streamed music files over the automobile audio system's speakers.

In some embodiments, the replica cassette tape mobile record/playback device 100 may comprise computer-readable instructions stored in one or more memory devices 127. In some embodiments, the software application being utilized to playback the stored music files or digital music files may retrieve the computer-readable instructions stored in the one or more memory devices 127 and execute the retrieved computer-readable instructions on one or more processors of the mobile communications device or electronic device. In some embodiments, these computer-readable instructions may be software that provides graphical input screens for the mix tape application software or even software that may be associated with the music files or digital files on the cassette tape record/playback device (e.g., images that should be displayed when the music files are played via the speaker).

In some embodiments, the replica cassette tape mobile record/playback device 100 may also comprise a stereo out jack (AUX out) 123 that can stream the audio files or music files to an existing audio receiver (AUX in) for playback on speakers of the existing audio system. In this embodiment, the cassette tape record/playback device 100 may further comprise conversion circuitry 122 (e.g., a digital-to-analog converter as well as control circuitry (e.g., one or more transistors, switches, logic gates) that convert the music files stored on the cassette tape record/playback device 100 from a digital format to an analog format that can be transferred out the stereo out or audio jack 123 to the existing stereo receiver In some embodiments, the cassette tape record/playback device 100 may also utilize computer-readable instructions (software) stored in one or memory devices 127 to assist in converting and/or transferring the music files between the USB storage device 115 and the stereo out jack 123 (and/or the audio conversion circuitry 122). In some embodiments, software residing on a mobile computing device may interface with the software stored in the one or memory devices 127 to perform this function. In some embodiments, a cassette tape record/playback device 100 may further comprise one or more processors or controllers which may execute the computer-readable instructions (or software) stored in the one or more memory devices 127 to assist in converting the music files between the replica cassette tape mobile playback device 100 and the stereo out or audio jack 123 (and/or the audio conversion circuitry 122). This may occur under certain conditions (e.g., such as a cable being plugged into the stereo out jack (AUX out) or there not being a mobile communications device/speaker/electronics device that is able to be paired via the cassette tape record/playback device). In embodiments, this may also occur during manual play.

Figure 1C:
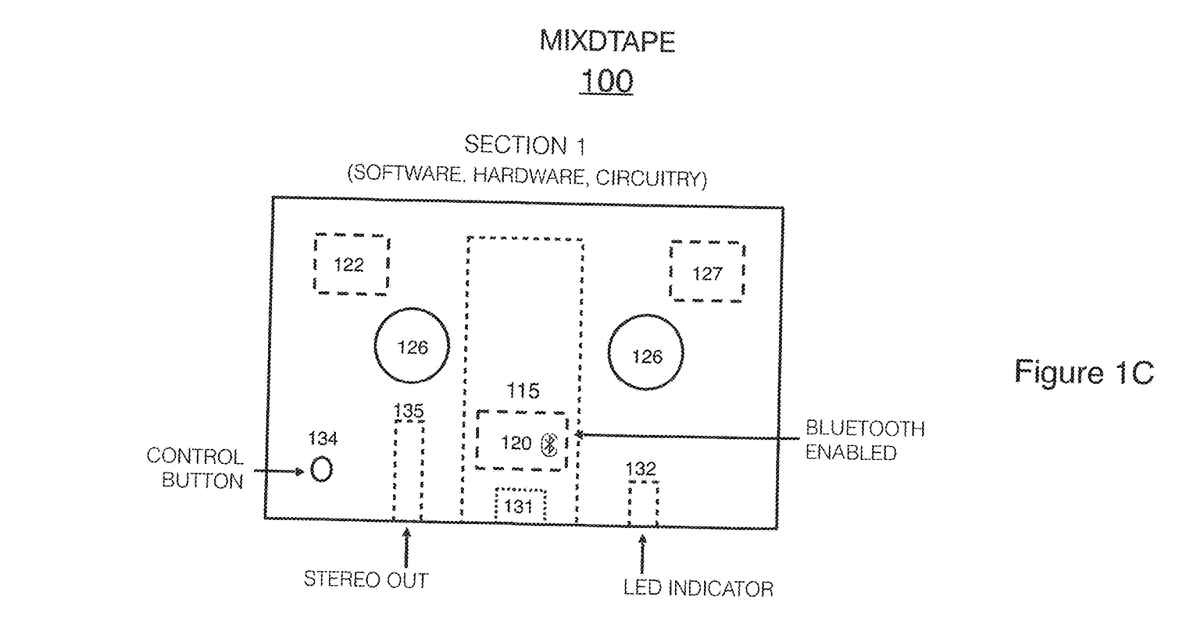
FIG. 1C illustrates a top view or a front view of replica cassette tape device according to another embodiment.
Figure 1D:
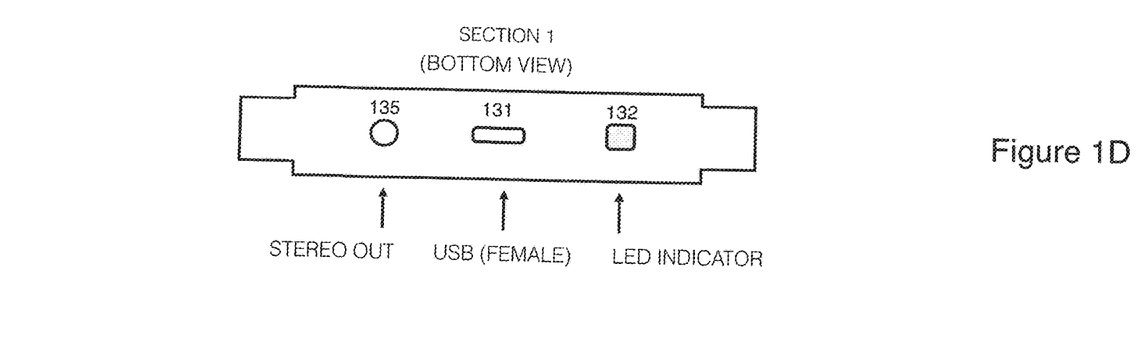
FIG. 1D illustrates a side view of a replica cassette device according to another embodiment.

FIG. 1C illustrates a top view or a front view of replica cassette tape device according to another embodiment. FIG. 1D illustrates a side view or a bottom view of a replica cassette device according to another embodiment. The embodiment shown in FIGS. 1C and 1D is a one-piece replica cassette tape device unlike the two-piece device illustrated in FIGS. 1A and 1B. In some embodiments, the storage device 115, the PAN wireless transceiver (e.g., Bluetooth transceiver) 120, the one or more memory devices 127, and/or the audio conversion circuitry 123 are integrated within the replica cassette tape device. In other words, these components may be located or positioned inside the replica cassette tape device and may not be accessible from the outside. In some embodiments, a top part of a replica cassette tape device may be connected, attached or adhered to a bottom part of a replica cassette tape device and the components may be installed before the top part and the bottom part are connected, attached or adhered. In some embodiments, the replica cassette tape device may be formed around the above-identified components and/or circuitry. This provides the advantage of protecting the circuitry from weather elements as well as normal wear and tear as individuals operated the replica cassette tape device. In some embodiments, the storage device 115 may be flash memory. In some embodiments, the storage device 115 may store the audio files that are downloaded to the replica cassette tape device. In some embodiments, the storage device may also comprise one or more processors. In some embodiments, the one or more memory devices 127 may be flash memory and/or non-volatile memory. In some embodiments, computer-readable instructions (e.g., the embedded MIXDTAPE software) may be stored in the one or more memory devices 127. In some embodiments, the embedded MIXDTAPE software may be executable by one or more processors to perform the functions and/or features of the MIXDTAPE device. In some embodiments, the MIXDTAPE device may further comprise one or more control buttons 134. In some embodiments, the one or more control buttons or button assemblies 134 may activate the MIXDTAPE device 100 or assist in performing other operations of the MIXDTAPE device (e.g., pause, rewind, fast-forward, play).

In some embodiments, FIG. 1D illustrates a bottom view or side view of the MIXDTAPE device according to some embodiments. In some embodiments, the bottom edge of the MIXDTAPE device may comprise an audio output connector or a stereo output connector 135 (e.g., an audio AUX connector), a USB connector 131 (to connect to a cable which is connected to another computing device for downloading or playing the audio files (or music) from the playlist). In some embodiments, the USB connector 131 may be a female connector. In some embodiments, the bottom edge of the MIXDTAPE device may comprise a light indicator 132 (e.g., a LED indicator) that identifies status and/or operation of the replica cassette tape device 100 (e.g., whether the replica cassette tape device is turned on or off and/or engaging in pause, rewind, play or other operations.

Figure 2:
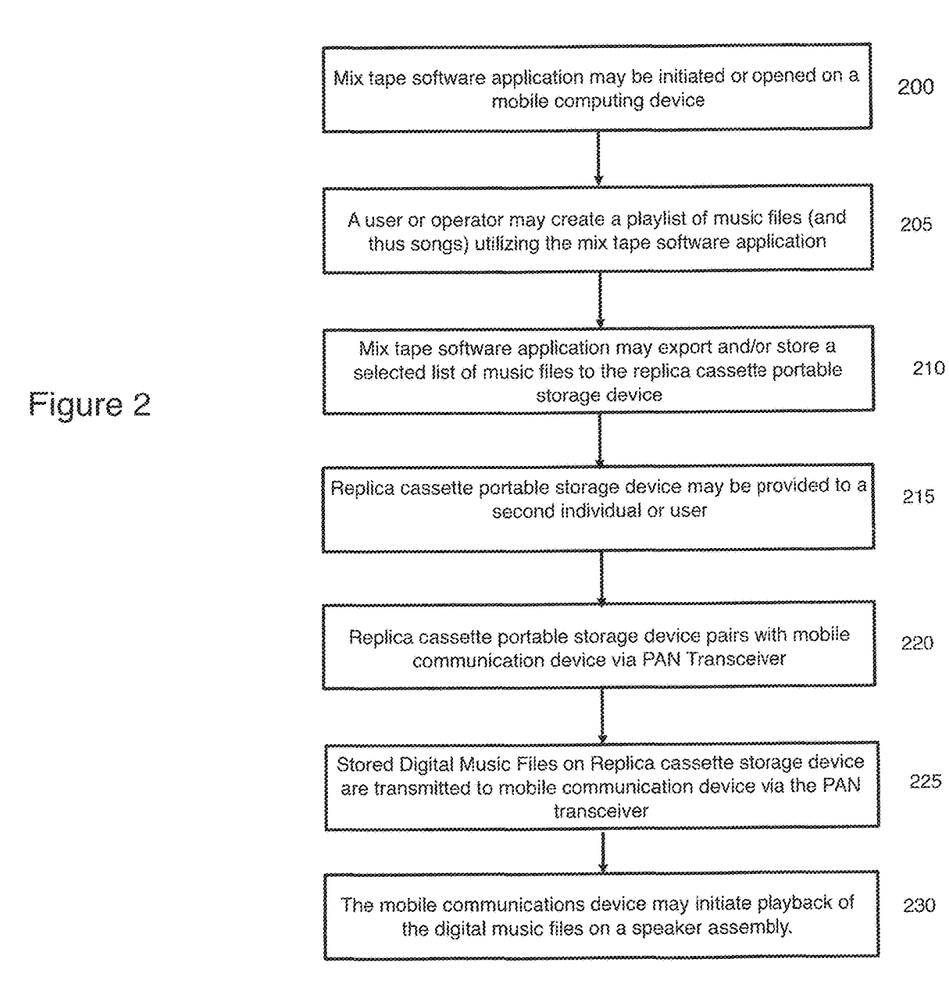
FIG. 2 illustrates a flowchart of a process of utilizing a mix tape software application and/or a cassette tape record/playback device according to embodiments.

FIG. 2 illustrates a flowchart of utilization of a mix tape according to some embodiments. In some embodiments, a MIXDTAPE software application may be initiated or opened 200 on a mobile computing device. In some embodiments, a MIXDTAPE software application may comprise computer-readable instructions stored in one or more memory devices and executed by one or more processors. In some embodiments, portions of a MIXDTAPE software application may be located and/or executable by one or more processors on a mobile computing device (and this may be referred to as a MIXDTAPE mobile software application). In some embodiments, portions of a MIXDTAPE software application may be located and/or executable by one or more processors on a server computing device and/or a cloud-based computing device. In other words, the MIXDTAPE software application may be a client-server software application where portions are executed on the mobile computing device and other portions are executed on a server computing device. Thus, in some embodiments, a MIXDTAPE software application may be accessed from a mobile computing device. In some embodiments, the MIXDTAPE software application may include web portal access, where a user logs into a web site via other computing devices (e.g., a laptop computing device, a tablet computing device, a network computing device, a wearable computing device, a desktop computing device), and then interact with the MIXDTAPE software application on the server or cloud computing device. In some embodiments, this may be referred to as a cloud-based or web-based MIXDTAPE software application and may be accessed by one of the computing devices listed above logging into a web address through a web browser. In some embodiments, this may be referred to as a browser-based or browser accessible MIXDTAPE software application.

In some embodiments, a MIXDTAPE software application may allow a user or operator to select a group of music files or songs to store onto a playback device (e.g., a cassette-shaped housing comprising at least one Universal Serial Bus device or other storage device). In some embodiments, utilizing the MIXDTAPE software application, a user or operator may import a playlist from Google Play, Pandora, Spotify, iTunes and/or another digital music software application. In some embodiments, utilizing the MIXDTAPE software application, a user or operator may create 205 a playlist of music files (and thus songs) utilizing the MIXDTAPE software application.

In some embodiments, a MIXDTAPE software application may store 210 a selected list of music files to the replica cassette portable playback device. In some embodiments, in order to store and/or export the selected list of music files to the replica cassette portable record/playback device, a user or operator may need to separate a first portion 140 of the cassette tape record/playback device from a second portion 150 of a cassette tape record/playback device. In some embodiments, this may allow the selected list of music files to be shared with another party. In some embodiments, the replica cassette tape record/playback device may be one price and may not need to be separated. In embodiments, a cassette tape record/playback device 100 may only have a limited amount of storage space in order to mimic the actual capacity of one of the original cassette tapes. In some embodiments, for example, an album used to be stored on a cassette tape and for example may only utilize 1 Gigabyte of storage which equates to a specified number of minutes of audio files. To be consistent with the original cassette tape, the replica cassette tape record/playback device may be limited to storing 1 Gigabyte of audio data, which may be approximately equal to the specified number of minutes of audio files.

In some embodiments, the replica cassette tape portable record/playback device may be provided 215 to a second individual or user. In some embodiments, the cassette tape record/playback device provides excellent protection from external environmental elements or other substances as compared to a typical USB device because the USB device 115 (or other storage device) is integrated into an interior of a cassette tape record/playback device (along with other electrical components of the replica cassette tape record/playback device). In addition, a cover 116 of the USB device may be integrated into the cassette tape record/playback device.

In some embodiments, the replica cassette tape portable record/playback device may pair 220 with a mobile communication device via a personal area network (PAN) transceiver. In embodiments, a PAN transceiver may be a Bluetooth transceiver. In alternative some embodiments, a PAN transceiver may be a Zigbee transceiver or other short-range transceivers. In some embodiments, a PAN transceiver may be integrated into a USB device or other storage device.

In some embodiments, the PAN transceiver (or Bluetooth transceiver) may transmit or play (or stream) 225 the stored digital music files or audio files on the replica cassette tape record/playback device to a mobile communication device. In some embodiments, this transmission or communication is not a transfer of the music file because the music file is played and not transferred and thus permanently stored onto the mobile communications device. In some embodiments, the stored digital music or audio files may be transferred to another computing device, e.g., a laptop, a tablet computing device, a desktop computing device, etc., via the PAN transceiver. In some embodiments, the stored digital music or audio files may be transferred or communicated via a stereo output connector to an audio subsystem or sound reproduction device and/or speaker (which is standalone or part of another electronic device).

In some embodiments, the mobile communications device may initiate 230 playback of the digital music files on a speaker assembly (or a sound reproduction device or assembly). In some embodiments, the speaker assembly (or sound reproduction device or assembly) may be located in or integrated into the mobile communications device. In some embodiments, the speaker assembly (or sound reproduction device or assembly) may be another Bluetooth-enabled device or smart device), or may be an Amazon Alexa speaker, or a Google Bluetooth-enabled speaker (or sound reproduction device or assembly). In some embodiments, a speaker assembly (or sound reproduction assembly) may be part of an audio receiver to which the replica cassette tape record/playback device may be connected or coupled.

Figure 4:
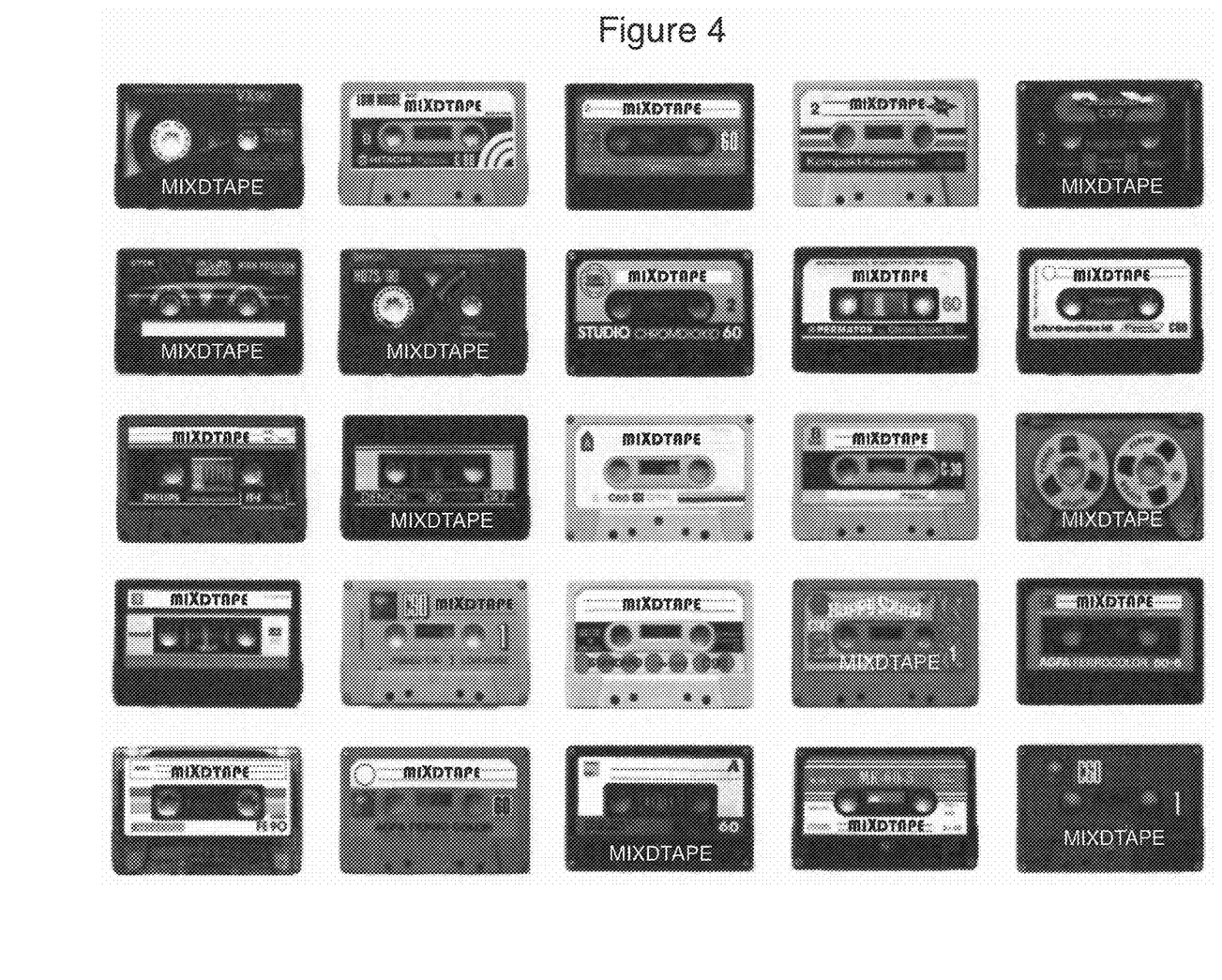
FIG. 4 illustrates examples of screen-printed cassette tape record/playback devices according to embodiments.

FIG. 4 illustrates a number of screen print designs for the replica cassette tape portable record/playback device. As is illustrated in FIG. 4, these cover past cassette tape designs and may be screen printed on both a top or front side of a replica cassette tape portable record/playback device as well as a bottom or back side. These may be referred to as Side A and Side B of the cassette tape portable record/playback device. In other embodiments, only one side of a cassette tape record/playback device may have a screen print. In some embodiments, the cassette tape record playback devices may include a window painted in a center of a surface which appears to have tape media in the window. Similarly, in some embodiments, the replica cassette tape portable record/playback devices may also have holes or circles painted or printed on a top/front surface and/or bottom/back surface. In some embodiments, the cassette tape record/playback devices may also have spindles painted or printed on a top/front surface and/or a bottom/back surface to be as realistic and true as possible to an original cassette tape design. In some embodiments, a replica cassette tape record/playback device 100 may also have one or more actual holes 126 that go from a front surface to a back surface. Similarly, in some embodiments, a replica cassette tape record/playback device 100 may have actual spindles (not shown) within the actual holes to have a more exact replica of the original cassette tape. However, these spindles perform no function since there is no actual tape media. In other words, the tape media is painted or printed on the surface of the replica cassette tape record/playback device 100.

Figure 3:
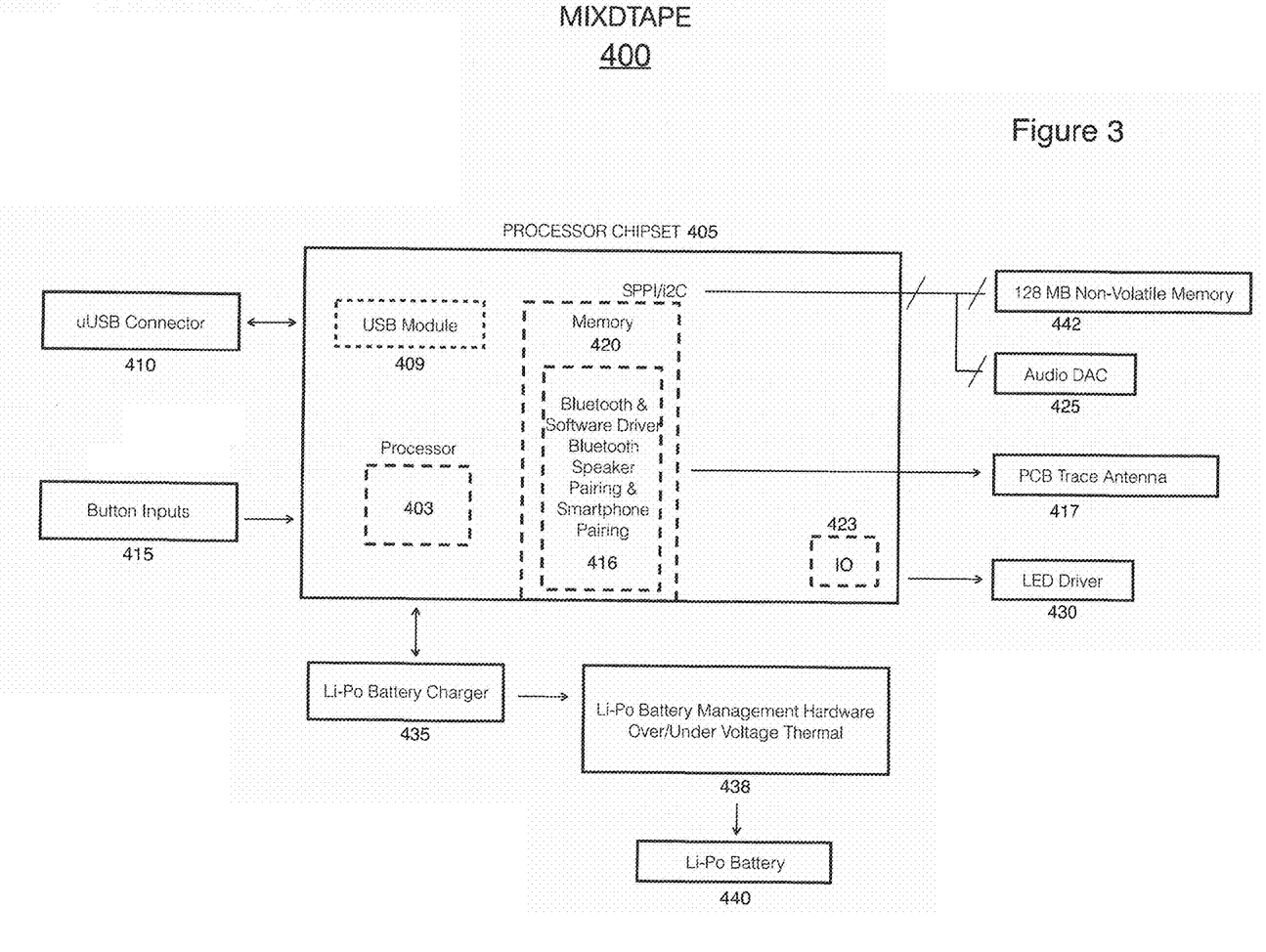
FIG. 3 illustrates a block diagram of modules and interfaces of a replica cassette tape mobile record/playback device according to some embodiments.

FIG. 3 illustrates a block diagram of modules and interfaces of a replica cassette tape mobile record/playback device according to some embodiments. In some embodiments, a replica cassette tape mobile record/playback device 400 may comprise a chip, a processor chipset or integrated circuit 405 including one or more processors 403, a USB module 409, computer-readable instructions stored in one or more memory devices 420, and a serial interface (e.g., either Serial Peripheral Interface or Inter-Integrated Circuit Interface and/or an input/output port 423 for communicating with peripheral devices). In some embodiments, the one or more processors 403 may include one or more baseband processors. In some embodiments, the chip, integrated circuit and processor chipset 405 may comprise a PCB trace antenna 417 and/or the PCB trace antenna may be located off the processor chipset 405. In some embodiments, the replica cassette tape mobile record/playback device 400 may comprise a USB connector 410, one or more memory devices 442, one or more button inputs 415, an audio digital-to-analog converter 425, an LED Driver 430 and LEDs. In some embodiments, as illustrated in FIG. 3, these devices or assemblies may not be located on the processor chipset 405. In some embodiments, a rechargeable battery 440 may provide power to the replica cassette tape mobile record/playback device 400. In some embodiments, the rechargeable battery 440 may also provide power to one or more battery charging assemblies 435 and/or battery management circuitry or hardware 438. In some embodiments, the rechargeable battery 440 may be a LiPo battery. In some embodiments, the battery management hardware and/or circuitry 438 may comprise over/under voltage and/or current circuitry and/or thermal circuitry. In some embodiments, the battery charging assembly 435, the battery management circuitry or hardware 438, and the rechargeable battery 440.

As illustrated in FIG. 3, in some embodiments, the one or more memory devices 442 may store the music files or audio files downloaded to the MIXDTAPE device 400. In some embodiments, the one or more memory devices 420 may store the embedded software including the operating system that controls operations of the MIXDTAPE device. In some embodiments, the one or more memory devices 442 (storing audio data) may be in the same physical memory devices as the one or more memory devices 420 storing the embedded MIXDTAPE operating software (but in different sections or partitions). In other embodiments, the one or more memory devices 442 (storing music and audio data) may be in separate physical memory devices from the one or more memory devices 420 storing embedded MIXDTAPE operating software.

In some embodiments, the processor chipset 405 may be a system-on-a-chip (SoC) or another chipset that combines multiple components together. In these embodiments, the processor chipset 405 may comprise one or more processors.

In some embodiments, computer-readable instructions 416 may be stored on the one or more memory devices may be embedded in a PROM, ROM or flash memory (e.g., a memory device 420) that is part of the chip, integrated circuit and/or the processor chipset 405. In some embodiments, a portion of the computer-readable instructions 416 may comprise a Bluetooth or software driver, Bluetooth speaker pairing software and/or smartphone software pairing, as is illustrated in FIG. 3.

In some embodiments, the computer-readable instructions 416 stored on the one or more memory devices 442 may be executable by one or more processors to store (or to cause to be stored) up to 128 MB of audio data on the one or more memory devices 442. In some embodiments, the computer-readable instructions 416 may be executable by one or more processors may control headphone, audio, and/or Bluetooth audio outputs. In some embodiments, the computer-readable instructions 416 may be executable by one or more processors 403 to control the rechargeable battery 440, the battery charger or charger assembly 435, and/or battery management hardware and/or circuitry 438. In some embodiments, the computer-readable instructions 416 may be executable by one or more processors 403 to control communications and/or data transfer via the USB connector 410 and/or the USB module. In some embodiments, the computer-readable instructions 416 executable by the one or more processors 403 may control interaction with the PCB trace antenna 417. In some embodiments, the computer-readable instructions 416 executable by the one or more processors 403 may control operation of the input/output port 429 and/or the LED Driver 430. In some embodiments, the computer readable instructions 416 executable by the one or more processors 403 may control interaction with the one or more button inputs or control buttons 410. In some embodiments, the computer-readable instructions 416 executable by the one or more processors 403 may control interaction with the audio output and/or the audio digital-to-analog converter 425. In some embodiments, the computer-readable instructions 416 may be stored in a memory that is not on the processor chipset 405 and also not part of the one or more memory devices 442 storing the audio files or music files.

In some embodiments, an MIXDTAPE application programming interface ("API") (e.g., computer-readable instructions executable by one or more processors) may communicate with a MIXDTAPE software application residing on and/or executable by one or more processors on a mobile communications device in order to interface with and/or communicate with the replica cassette tape mobile record/playback device 400. In some embodiments, the MIXDTAPE software app (on the mobile communication device) may interface with the MIXDTAPE API to create, read, update and/or delete stored media on the replica cassette tape mobile record/playback device 400. In some embodiments, the MIXDTAPE software app may interface with the MIXDTAPE API to read and/or update the firmware on the replica cassette tape mobile record/playback device 400. In some embodiments, the MIXDTAPE software app may interface with the MIXDTAPE API to read the replica cassette tape mobile record/playback device battery charge 440 level as well as the battery health.

In some embodiments, the software stored in one or more memory devices of the replica cassette tape mobile record/playback device 400 may be executable by one or more processors to perform and/or control a number of features and/or functions. In some embodiments, the MIXDTAPE device embedded software may communicate with additional Bluetooth (or personal area network—PAN) enabled devices (e.g., a Bluetooth audio receiver) based on proximity (e.g., signal strength) in order to pair the MIXDTAPE device 400 with additional Bluetooth-enabled devices. In some embodiments, the MIXDTAPE device embedded software may allow rechargeable battery status to be viewed by communicating with LEDs (or other lighting devices) to display a certain pattern. In some embodiments, the MIXDTAPE device embedded software may interface with an on/off button (or other similar device) in order to recognize activation (e.g., turning on) or deactivation (e.g., turning off) of the MIXDTAPE device 400. In some embodiments, the MIXD device embedded software may interface with the 128 MB Non-Volatile Memory Device to play the audio files stored on the 128 MB Memory Device and to reproduce the audio files on an attached speaker and/or on a paired Bluetooth external device. In some embodiments, the MIXDTAPE device embedded software may pause the playback of the audio files stored on the 128 MB Non-volatile memory device in response to an associated input. In some embodiments, the MIXDTAPE device embedded software may fast forward one or more tracks and/or segments of the audio files in response to an associated input on the MIXDTAPE device 400. In some embodiments, the MIXDTAPE device embedded software may rewind one or more tracks and/or segments of the audio files in response to an associated input on the MIXDTAPE device 400. In some embodiments, the MIXDTAPE device embedded software may be able to switch playlists (e.g., sides) of the audio files in response to an associated input. In some embodiments, the MIXDTAPE device embedded software may control output volume (e.g., increase and/or decrease) of the playback on the paired external Bluetooth device in response to an associated input. In some embodiments, the MIXDTAPE device embedded software may be able to limit the amount of songs and/or audio files that are recorded on the 128 MB Memory Device. In some embodiments, the MIXDTAPE application software (on the mobile communication device) (or a combination of the MIXDTAPE device embedded software and application software) may be able to limit the amount of songs and/or audio files that are recorded on the 128 MB Memory Device.

In some embodiments, a mobile computing or communications device may comprise a smart phone, a tablet, a network computer, an iPAD®, small laptop computers without support and/or other one non-hinged computing devices.

In some embodiments, a replica cassette tape device includes a non-volatile memory device positioned within an interior of the replica cassette tape device; one or more processors positioned within the interior of the replica cassette tape device; a rechargeable battery positioned within the interior of the replica cassette tape device; a personal area network transceiver chipset positioned within the interior of the replica cassette tape device; and one or more indicator lights, positioned at an edge of the replica cassette tape device, to identify a status of the replica cassette tape device. In some embodiments, computer-readable instructions are stored in the non-volatile memory device, the computer-readable instructions executable by the one or more processors to pair the replica cassette tape device with an external sound reproduction device utilizing the personal area network transceiver chipset; and communicate one or more audio files stored in the non-volatile memory device to the external sound reproduction device utilizing the personal area network transceiver chipset. In some embodiments, the personal area network transceiver operates according to a Bluetooth communication protocol. In some embodiments, the personal area network transceiver comprises a printed circuit board trace antenna positioned within the interior of the replica cassette tape device. In some embodiments, the replica cassette tape device includes a universal serial bus (USB) chipset and a USB connector, the USB chipset positioned within the interior of the replica cassette tape device and the USB connector is positioned at an edge of the replica cassette tape device. In some embodiments, the USB connector is utilized to receive a cable to provide power to the replica cassette tape device or recharge the replica cassette tape device. In some embodiments, the USB connector and USB chipset are utilized to receive the one or more audio files from an external computing device. In some embodiments, the replica cassette tape device further includes a rechargeable battery charging assembly and a battery management module positioned within the interior of the replica cassette device, the rechargeable battery charging assembly and the battery management module to manage charging and operation of the rechargeable battery. In some embodiments, the replica cassette tape device further includes one or more button input devices, the one or more button input devices to communicate signals to the one or more processors to control some operations of the replica cassette tape device, the one or more button input devices positioned on an edge of the replica cassette tape device. In some embodiments, the replica cassette tape device further includes an audio chipset and an audio connector, the computer-readable instructions executable by the one or more processors to communicate the one or more audio files to a sound reproduction via the audio chipset and the audio connector. In some embodiments, the audio chipset is positioned within the interior of the replica cassette tape device and the audio connector is positioned at an edge of the replica cassette tape device.

A replica cassette tape device may include a non-volatile memory device positioned within an interior of the replica cassette tape device; one or more processors positioned within the interior of the replica cassette tape device; a rechargeable battery positioned within the interior of the replica cassette tape device; a universal serial bus (USB) chipset and a USB connector, the USB chipset positioned within the interior of the replica cassette tape device and USB connector positioned at an edge of the replica cassette tape device; and one or more indicator lights, positioned at an edge of the replica cassette tape device, to identify a status of the replica cassette tape device. The replica cassette tape device may further include computer-readable instructions stored in the non-volatile memory device, the computer-readable instructions executable by the one or more processors to: receive one or more audio files from an external computing device via the USB connector and the USB chipset; and store the received one or more audio files in the non-volatile memory device; and stop storing the received one or more audio files once a time threshold has been reached. In some embodiments, the time threshold may be 60 minutes, which was a length of potential recording on an actual cassette tape device. In some embodiments, the time threshold may be 90 minutes, which was the length of potential recording on an actual cassette tape. In some embodiments, a personal area network transceiver chipset positioned within the interior of the replica cassette tape device, the computer-readable instructions executable by the one or more processors to: pair the replica cassette tape device with an external sound reproduction device utilizing the personal area network transceiver chipset; and communicate one or more audio files stored in the non-volatile memory device to the external sound reproduction device utilizing the personal area network transceiver chipset. In some embodiments, the personal area network transceiver operates according to a Bluetooth communication protocol. In some embodiments, the personal area network transceiver includes a printed circuit board trace antenna positioned within the interior of the replica cassette tape device. In some embodiments, the replica cassette tape device further includes a rechargeable battery charging assembly and a battery management module positioned within the interior of the replica cassette device, the rechargeable battery charging assembly and the battery management module to manage charging and operation of the rechargeable battery. In some embodiments, the replica cassette tape device further includes one or more button input devices, the one or more button input devices to communicate signals to the one or more processors to control some operations of the replica cassette tape device, the one or more button input devices positioned on an edge of the replica cassette tape device. In some embodiments, the replica cassette tape device further includes an audio chipset and an audio connector, the computer-readable instructions executable by the one or more processors to communicate the one or more audio files to a sound reproduction via the audio chipset and the audio connector. In some embodiments, the audio chipset is positioned within the interior of the replica cassette tape device and the audio connector is positioned at an edge of the replica cassette tape device.

MIXDTAPE is a new, novel and inventive take on a lost medium and art form, reinventing the very personal and creative nature of cassette mixed tapes (e.g., tapes, mixtapes, MIXDTAPE) that captures the excitement and romance of making and giving a "mix" you created for a road trip, a friend or lover. MIXDTAPE combines the physical, visceral and emotional qualities of old cassette tapes using cassette replicas along with the digital technology of today.

Imagine a bluetooth enabled device in the shape of a cassette tape that makes it easy to actually give a "mix" to a friend. First, create a "mix" from your laptop or mobile device with the downloadable software/app. The mix is then easily loaded onto the MIXDTAPE device ready to be shared. The music is played using your smart phone as the controller and broadcast via bluetooth (or stereo out) through your car or home stereo, mobile device/headphones.

MIXDTAPE music cannot be "downloaded" onto another playback device or memory stick, thus can only be played when paired with your phone/laptop, car etc. This feature preserves the personality of old cassettes, plays fairly within music rights and should actually promote music downloads.

In some embodiments, the MIXDTAPE device is a Bluetooth enabled device to replicate a shade and dimensions of a classic cassette tape. In some embodiments, the MIXDTAPE device is not a flash drive. In contrast, in some embodiments, the MIXDTAPE device may be embedded software stored in the MIXDTAPE device designed to be used to create, store and playback of personal music mixes (or groups of audio files). In some embodiments, a user may access a music library of audio files and create a customized mix (or playlist of audio files) from the music library of audio files. In some embodiments, the playlist of audio files may be loaded onto the MIXDTAPE device, the playlist of audio files may be listened two via three methods (via a computing device connected to a micro USB adapter; via a stereo output connector of the MIXDTAPE device; or when paired with a Bluetooth enabled device that can reproduce sound.

In some embodiments, the MIXDTAPE software application may allow a user or operator to stream music files or audio files without having ownership of the songs related to the music files or audio files. In some embodiments, the MIXDTAPE software application may not require the user or operator to download the songs onto the MIXDTAPE device. In these embodiments, the user or operator, through the MIXDTAPE software application may just download a song ID or song identifier to the MIXDTAPE device which creates a mix identifier (which is a list of song IDs or song identifiers). In these embodiments, when a recipient of the MIXDTAPE device communicatively pairs the MIXDTAPE device to the MIXDTAPE software application (which may reside on a mobile communications device or other computing device—as described above), the MIXDTAPE software application may link the recipient to their own music file or audio file streaming service (e.g., Spotify, Apple Music, Pandora) and may play the desired music mix by pulling or receiving each song from the one or more streaming services in the same order identified by the mix ID data loaded on the MIXDTAPE device.

In some embodiments, music file or audio file mixes created by the mobile application based or browser-based MIXDTAPE software may be playable by the MIXDTAPE software application even if the music file or audio file mixes are not loaded onto a MIXDTAPE device. In these embodiments, the music file or audio file mixes may even be able to be seen by other users in a MIXD Online Community that the MIXDTAPE user or operator belongs to or has joined. In these embodiments, the other users may be able to MIXDTAPE music file or audio file mixes of other users like playlists are listened to on Spotify. In these embodiments, the difference between a Spotify playlist and a MIXDTAPE playlist is that that these MIXDTAPE Playlists may still be restricted to 90-minute (45 min/side) and 120-minute (60 min/side) formats. In these embodiments, this restriction may make these MIXDTAPE playlists themselves very unique (compared to all other sharable, viewable, listenable playlists on other streaming services).

In some embodiments, a user may access a cloud-based or server web-site directly or may use a mobile software application to access the web site and may create a customized playlist. In some embodiments, the software may limit the amount of songs (or audio files) to 90 minutes or 120 minutes based upon a price paid by a user. In some embodiments, a user may then connect the MIXDTAPE Device to a computing device running the software of the MIXDTAPE web site. In some embodiments, the user may download the customized playlist audio files to the MIXDTAPE device. In some embodiments, the web site may have web-site purchases or mobile application purchases for new MIXDTAPE devices and/or to increase capacity of a previously existing MIXDTAPE, and/or a MIXDTAPE device that matches the customized playlist of the user. The MIXDTAPE web site is a social community that encourages music lovers to share and discuss music (or audio songs) mixes, investigating new music and/or engage in like-minded members who like the customized mixes.

In some embodiments, the MIXDTAPE web site may include web-based interfaces that are compatible with current and previous versions of existing browsers: Safari, Chrome, Internet Explorer, Firefox, and/or Microsoft Edge.

In some embodiments, users may create accounts on the MIXDTAPE web site. In some embodiments, the accounts may be stored in one or more memory devices of the MIXDTAPE web site. In some embodiments, the user accounts may utilize an email address as an unique identifier, a first name, a last name, an optional screen name, an optional physical mailing address, and/or a password. In some embodiments, the passwords may be an industry standard minimum 8 characters, upper case, lower case, or special character. In some embodiments, the passwords may be automatically reset via the browser with text and/or security questions.

In some embodiments, users may create accounts on the MIXDTAPE web site. In some embodiments, the accounts may be stored in one or more memory devices of the MIXDTAPE web site. In some embodiments, the user accounts may utilize an email address as an unique identifier, a first name, a last name, an optional screen name, an optional physical mailing address, and/or a password. In some embodiments, the passwords may be an industry standard minimum 8 characters, upper case, lower case, or special character. In some embodiments, the passwords may be automatically reset via the browser with text and/or security questions.

In some embodiments, a user may plug in the USB connector of the MIXDTAPE device to a cable to connect to a local computing device. In some embodiments, the local computing device may need to access the user's device management in order to load device drivers and/or to make the MIXDTAPE device available to load (or receive audio files).

In some embodiments, a user may connect a MIXDTAPE device to a local computing device via a wireless personal area network (e.g., Bluetooth) connection.

In some embodiments, in order to transfer customized playlist songs (or audio files), the MIXDTAPE software may need to access the user's local hard drive (or online music account) in order to search for playlist songs (or audio files), which may be in a MP3 or Apple music format.

In some embodiments, the MIXDTAPE software may read audio files from the MIXDTAPE device, write audio files to the MIXDTAPE device, and/or modify the audio files on the MIXDTAPE device. In some embodiments, when a replica MIXDTAPE devices is first accessed, the MIXDTAPE software may assign a unique identifier for an associate owner or creator, which associates the owner, profile and MIXDTAPE device with each other. In this embodiment, this is the only person/account that can read/write to the MIXDTAPE device. In this embodiment, the receivers of the MIXDTAPE device may only be able to listen to music or audio files stored thereon, but may not be able to download it or transfer it from the MIXDTAPE device. In some embodiments, the MIXDTAPE software may also include a counter or numerical indicator that may recognize the size of the MIXDTAPE device and may display a status of how many audio files are loaded on the MIXDTAPE device and what space may still be available. In addition, the MIXDTAPE software may also provide an indicator of where the MIXDTAPE is in playing of the audio files (or music files) on the MIXDTAPE device (e.g., which track is being played, how much time is left, how may songs are left). These may be viewed by the users.

In some embodiments, the mobile software application may need to be compatible with Apple computing devices and music devices (e.g., iPhones, iPads, iPods) and Android computing devices. In some embodiments, the MIXDTAPE mobile software application may be available via iTunes or Google Play download stores. In some embodiments, the MIXDTAPE mobile application software may have all the functionality of the MIXDTAPE browser-based version.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor. The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step. In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally, or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including," "incorporating," "includes," "incorporates," and "having" (and their derivatives), as used in the specification and claims, are interchangeable with and shall have the same meaning as the word "comprising."

The processor as disclosed herein can be configured with instructions to perform any one or more steps of any method as disclosed herein.

The above disclosure is sufficient to enable one of ordinary skill in the art to practice the invention, and provides the best mode of practicing the invention presently contemplated by the inventor. While there is provided herein a full and complete disclosure of the preferred configurations of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

The invention claimed is:

1. A replica cassette tape device, comprising:
   a non-volatile memory device positioned within an interior of the replica cassette tape device;
   one or more processors positioned within the interior of the replica cassette tape device;
   a rechargeable battery positioned within the interior of the replica cassette tape device;
   a universal serial bus (USB) chipset and a USB connector, the USB chipset positioned within the interior of the replica cassette tape device and USB connector positioned at an edge of the replica cassette tape device;
   one or more indicator lights, positioned at an edge of the replica cassette tape device, to identify a status of the replica cassette tape device;
   computer-readable instructions stored in the non-volatile memory device, the computer-readable instructions executable by the one or more processors to:
   receive one or more audio files from an external computing device via the USB connector and the USB chipset; and
   store the received one or more audio files in the non-volatile memory device; and
   stop storing any additional audio files once a count of a number of minutes of stored audio files reaches a time threshold and not erasing the stored one or more audio files.

2. The replica cassette tape device of claim 1, wherein the time threshold is 60 minutes, which was a length of potential recording on an actual cassette tape device.

3. The replica cassette tape device of claim 1, wherein the time threshold is 90 minutes, which was the length of potential recording on an actual cassette tape.

4. The replica cassette tape device of claim 1, further comprising a personal area network transceiver chipset positioned within the interior of the replica cassette tape device, the computer-readable instructions executable by the one or more processors to:
   pair the replica cassette tape device with an external sound reproduction device utilizing the personal area network transceiver chipset; and
   communicate selected one or more audio files stored in the non-volatile memory device to the external sound reproduction device utilizing the personal area network transceiver chipset.

5. The replica cassette tape device of claim 4, wherein the personal area network transceiver operates according to a Bluetooth communication protocol.

6. The replica cassette tape device of claim 4, wherein the personal area network transceiver comprises a printed circuit board trace antenna positioned within the interior of the replica cassette tape device.

7. The replica cassette tape device of claim 1, further comprising a rechargeable battery charging assembly and a battery management module positioned within the interior of the replica cassette device, the rechargeable battery charging assembly and the battery management module to manage charging and operation of the rechargeable battery.

8. The replica cassette tape device of claim 1, further comprising an audio chipset and an audio connector, the computer-readable instructions executable by the one or more processors to communicate the one or more audio files to a sound reproduction device via the audio chipset and the audio connector.

9. The replica cassette tape device of claim 1, wherein the audio chipset is positioned within the interior of the replica cassette tape device and the audio connector is positioned at an edge of the replica cassette tape device.

10. The replica cassette tape device of claim 1, further comprising:
    a mobile communication device, the mobile communication device comprising:
    one or more processors;
    one or more memory devices;
    computer-readable instructions stored in the one or more memory devices and executable by the one or more processors of the mobile communication device to:
    control operations of the replica cassette tape device.

11. The replica cassette tape device of claim 10, further comprising a personal area network transceiver chipset positioned within the interior of the replica cassette tape device, the computer-readable instructions executable by the one or more processors of the mobile communication device to:
    pair the replica cassette tape device with an external sound reproduction device utilizing the personal area network transceiver chipset; and communicate selected one or more audio files stored in the non-volatile memory device to the external sound reproduction device utilizing the personal area network transceiver chipset.

12. The replica cassette tape device of claim 11, the controlled operations including pausing the communicating of the selected one or more audio files.

13. The replica cassette tape device of claim 10, wherein the controlled operations include creating, reading, or updating the stored audio files.

14. The replica cassette tape device of claim 10, wherein the controlled operations comprise reading or updating the firmware on the replica cassette tape device.

15. The replica cassette tape device of claim 10, wherein the controlled operations comprise reading the replica tape device charge level as well as the battery level.

16. The replica cassette tape device of claim 10, wherein the stored one or more audio files are one or more song identifiers; and wherein the mobile communication device further comprises:

computer-readable instructions executable by the one or more processors of the mobile communications device to:

play a desired music mix of audio files corresponding to the stored one or more song identifiers by pulling or receiving each of the desired mix of audio files from the one or more streaming services in the same order identified by the stored one or more song identifiers on the MIXDTAPE device.

17. The replica cassette tape device of claim 10, wherein the mobile communications device further comprises computer-readable instructions executable by the one or more processors of the mobile communications device to prevent copying of the stored one or more audio files to another storage device.

* * * * *